United States Patent
Puustinen

(10) Patent No.: US 8,898,167 B2
(45) Date of Patent: Nov. 25, 2014

(54) METHOD OF ACCESSING FILES IN ELECTRONIC DEVICES

(75) Inventor: Pirkka Puustinen, Vantaa (FI)

(73) Assignee: Open Invention Network, LLC, Durham, NC (US)

( * ) Notice: Subject to any disclaimer, the term of this patent is extended or adjusted under 35 U.S.C. 154(b) by 1002 days.

(21) Appl. No.: 11/174,092

(22) Filed: Jun. 30, 2005

(65) Prior Publication Data

US 2006/0123061 A1    Jun. 8, 2006

(30) Foreign Application Priority Data

Dec. 8, 2004 (FI) .................................. 20041538

(51) Int. Cl.
G06F 17/30    (2006.01)

(52) U.S. Cl.
CPC ............................. *G06F 17/30067* (2013.01)
USPC .......................................... 707/737; 707/740

(58) Field of Classification Search
CPC ................... G06F 17/30067; G06F 17/30197; G06F 17/301; G06F 17/3071; G06F 3/0622; G06F 3/0637; G06F 3/0683; G06F 21/53; G06F 17/30017; G06F 17/30041; G06F 17/30749; G06F 17/30764; G06F 17/30772
USPC .......... 707/200, 9, 737, 740; 717/175; 714/2; 713/1; 719/310
See application file for complete search history.

(56) References Cited

U.S. PATENT DOCUMENTS

| | | | | |
|---|---|---|---|---|
| 5,101,492 | A | * | 3/1992 | Schultz et al. ............... 714/6.32 |
| 5,239,659 | A | * | 8/1993 | Rudeseal et al. ............. 714/6.12 |
| 5,511,227 | A | * | 4/1996 | Jones ................. 710/9 |
| 5,778,384 | A | * | 7/1998 | Provino et al. ........................ 1/1 |
| 5,915,096 | A | * | 6/1999 | Rosenzweig et al. ......... 709/227 |
| 6,026,402 | A | * | 2/2000 | Vossen et al. .......................... 1/1 |
| 6,032,223 | A | | 2/2000 | Beelitz |
| 6,438,663 | B1 | * | 8/2002 | Agarwal et al. ............... 711/148 |
| 6,745,311 | B2 | * | 6/2004 | Fabrizio et al. ............... 711/172 |
| 7,181,738 | B2 | * | 2/2007 | Chan .............................. 717/175 |
| 2002/0083367 | A1 | * | 6/2002 | McBride et al. ................ 714/15 |
| 2002/0091805 | A1 | * | 7/2002 | Phillips et al. ................ 709/220 |
| 2003/0084368 | A1 | | 5/2003 | Sprunt et al. |
| 2004/0049668 | A1 | * | 3/2004 | Miyamoto et al. ................ 713/1 |
| 2005/0010610 | A1 | * | 1/2005 | Nishimura .................... 707/200 |
| 2005/0144501 | A1 | * | 6/2005 | Kim et al. ......................... 714/2 |

FOREIGN PATENT DOCUMENTS

| | | |
|---|---|---|
| EP | 1 467 282 | 12/2004 |
| WO | 00/36380 | 6/2000 |
| WO | 02//35348 | 5/2002 |

* cited by examiner

*Primary Examiner* — Apu Mofiz
*Assistant Examiner* — Fariborz Khoshnoodi
(74) *Attorney, Agent, or Firm* — Haynes and Boone, LLP

(57) ABSTRACT

In a method for accessing files in an electronic device, a Random Access Memory (RAM) disk is set-up to store the file system root of the electronic device. At least one file system to be mounted is discovered in the electronic device. Mount points are established on the RAM disk for each file system. Drive identifiers are assigned for each file system. A file access request comprising a first file name path comprising a drive identifier is detected. The drive identifier is mapped to a mount point and a second file name path based on the mount point and the first file name path is formed. Thereupon, a file is accessed using the second file name path in the electronic device.

16 Claims, 4 Drawing Sheets

METHOD OF ACCESSING FILES IN ELECTRONIC DEVICES

BACKGROUND OF THE INVENTION

1. Field of the invention

The invention relates to the access of files in electronic devices. Particularly, the invention relates to logical file names in a computer system comprising a primary memory and at least two secondary memories.

2. Description of the Related Art

User friendliness is an important factor for the success of any operating system. Especially this is true when it comes to the way files are organized and referred to in the operating system. It must be easy as well for an inexperienced user to find his files and for an experienced user to be able to quickly manage complicated directory trees.

Presently, there are two different paradigms in the organizing of file systems. The most familiar paradigm originates from the Microsoft MS-DOS™ operating system and has been evolved from there to the most recent Microsoft WINDOWS™ operating system versions. Some aspects of the Microsoft WINDOWS™ NT architecture originate from the Digital VAX/VMS™ operating system. In Microsoft WINDOWS™ separate file systems are referred to using letter symbols such as "A:", "B:", "C:", "D:" and "E:". The letter "A:" mostly refers to a disk drive for removable diskettes, "C:" to the local hard disk drive, "D:" to CD-ROM station and letter from "E:" onwards to network file systems or secondary partitions on the local hard disk drive.

The second somewhat different paradigm originates from the UNIX™ operating system. Recently the open source LINUX™ has become the most popular operating system in the family of UNIX™ look-alike operating systems. In LINUX™ operating system all files accessible within a computer are organized as a vast directory tree. Individual file systems such as diskette drives, hard disk partitions and network file systems are mounted to a given node within the directory tree. The node is called a mount point. The file systems may be mounted to an arbitrary node. Due to this fact the actual physical location of individual files is effectually hidden from the users. This may lead to various sorts of problems, for example, confidential files may accidentally be copied on a network file system accessible to other users. Similarly, it may be difficult for the user to know what files are located on the hard disk drive and what in a removable memory medium.

Reference is now made to FIG. 1, which illustrates an example of a directory tree in a LINUX™ computer. The directory tree comprises a number of subdirectories. The subdirectories are located either on a partition on a hard disk drive 100 or on a Network File System (NFS) directory 105, which is accessed via network 140. Network 140 is, for example, a Internet Protocol (IP) network. In FIG. 1 hard disk drive 100 has been partitioned to partitions 101, 102, 103 and 104. Partition 104 has been designated as a boot partition, from which the operating system kernel is loaded. Partition 104 is also assigned as the root partition, on which the root node 120 of the directory tree is located. The file system on the root partition is mounted to root node 120 during the booting process as illustrated with line 134. The file system on partition 101 is mounted to node 122, which represents subdirectory "/usr", as illustrated with line 131. The file systems on partitions 102 and 103 are mounted to nodes 125 and 126, respectively, as illustrated with lines 132 and 133. NFS directory 105 is mounted to node 121, as illustrated with line 135. The subdirectories 123 and 124 are located on the file system on root partition 104 even though the subdirectories, in other words nodes, 125 and 126 act as mount points for the file systems on partitions 102 and 103, respectively.

The problems associated with LINUX™ file system organization as a single directory tree are evident from FIG. 1. For an inexperienced user the directory tree structure may not be very illustrative as to where files are physically located. Especially, the location of mount points 125 and 126 within the root file system may lead to confusions. Similarly, the remote nature of NFS directory 105 is not explicit for the user. However, despite the problems associated with file naming, the LINUX™ operating system has some clear advantages. Therefore, a file system would be preferable, which incorporates both the explicit drive naming from MS-DOS™ and the features of a LINUX™ file systems. Such file system should be operable within the LINUX™ operating system environment without necessitating significant changes to it. The file system and the file access therein should employ the operating system services directly from the LINUX™ operating system.

SUMMARY OF THE INVENTION

The invention relates to a method for accessing files in an electronic device. The method comprises: setting up a Random Access Memory (RAM) disk, the Random Access Memory (RAM) disk comprising the file system root of the electronic device, discovering at least one file system to be mounted in the electronic device, establishing mount points on the Random Access Memory (RAM) disk for each said file system, assigning drive identifiers for each said file system, detecting a file access request comprising a first file name path comprising a drive identifier, mapping the drive identifier to a mount point, forming a second file name path based on the mount point and the first file name path, and accessing a file using the second file name path in the electronic device.

The invention relates also to an electronic device comprising a processor and a Random Access Memory (RAM), the electronic device further comprising: an operating system configured to set up a Random Access Memory (RAM) disk, the Random Access Memory (RAM) disk configured to comprise the file system root of the electronic device, and to access a file using a second file name path in the electronic device; and a file system handler entity configured to discover at least one file system to be mounted in the electronic device, to establish mount points on the Random Access Memory (RAM) disk for each said file system, to assign drive identifiers for each said file system, to detect a file access request comprising a first file name path comprising a drive identifier, to map the drive identifier to a mount point, and to form a second file name path based on the mount point and the first file name path.

The invention relates also to a computer program comprising code adapted to perform the following steps when executed on a data-processing system: setting up a Random Access Memory (RAM) disk, the Random Access Memory (RAM) disk comprising the file system root of an electronic device, discovering at least one file system to be mounted in the electronic device, establishing mount points on the Random Access Memory (RAM) disk for each said file system, assigning drive identifiers for each said file system, detecting a file access request comprising a first file name path comprising a drive identifier, mapping the drive identifier to a mount point, and forming a second file name path based on the mount point and the first file name path.

In one embodiment of the invention, the operating system comprises the LINUX™ operating system. In one embodiment of the invention, the accessing of a file comprises, for example, reading, writing, opening or closing operations on the file or any operations involving the providing of the file name path to any kind of a file manager entity within the operating system. For example, the file may also be searched from a directory.

In one embodiment of the invention, a first partition comprising a first file system comprising operating system executable files is formed. Similarly, a second partition comprising a second file system comprising at least one operating system configuration file is formed. As the system is booted, the operating system boot loader provides information on the first partition to the file system handler entity. On the Random Access Memory (RAM) disk a first link to the first file system and a second link to the second file system are formed by the file system handler entity.

In one embodiment of the invention, at least one logical drive is checked for the presence of at least a first predefined directory by a path set-up entity. At least one file search path is formed comprising an entry for each logical drive on which the first predefined directory was present by the path set-up entity; and the at least one file search path is stored to at least one environment variable by the path set-up entity. The path set-up entity is a part of the file system handler entity.

In one embodiment of the invention, a request for a file the name of which comprises a third file name path comprising a universal drive identifier is detected by the file system handler entity. The universal drive identifier is mapped to at least two drive identifiers by the file system handler entity. The logical drives identified using the at least two drive identifiers are checked for the presence of the file by the file system handler entity. The first file name path comprising a drive identifier for the logical drive on which the file is present is formed by the file system handler entity.

In one embodiment of the invention, the electronic device accesses the second partition from a remote node. In this case the term partition refers not only to actual disk partitions, but also to a Network File System (NFS) directory or other file system served from a remote node over the network.

In one embodiment of the invention, the second partition is accessed by the electronic device from a removable memory medium.

In one embodiment of the invention, the computer program is stored on a computer readable medium. The computer readable medium may be a removable memory card, magnetic disk, optical disk or magnetic tape.

In one embodiment of the invention, the electronic device is a mobile device, for example, a laptop computer, a palmtop computer, a mobile terminal or a personal digital assistant (PDA). In one embodiment of the invention, the electronic device is a desktop computer or a mainframe computer.

The benefits of the invention are related to the improved flexibility in the handling of removable or mountable mass memory devices or services. With the invention it is easier to port applications on a portable mass memory from one computer system to another. The ported applications and their configuration data may be referred to using uniform file name paths across different systems due to the use of uniform drive identifiers. The invention makes it possible to upgrade operating systems and applications while maintaining their old configuration data. This is once again possible because of the use of drive identifiers. Configuration data may be assigned on a logical drive separate from the logical drive containing executable files. The invention makes also the system easier to use and facilitates security, because mere directory names will not lead outside of the current file system.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
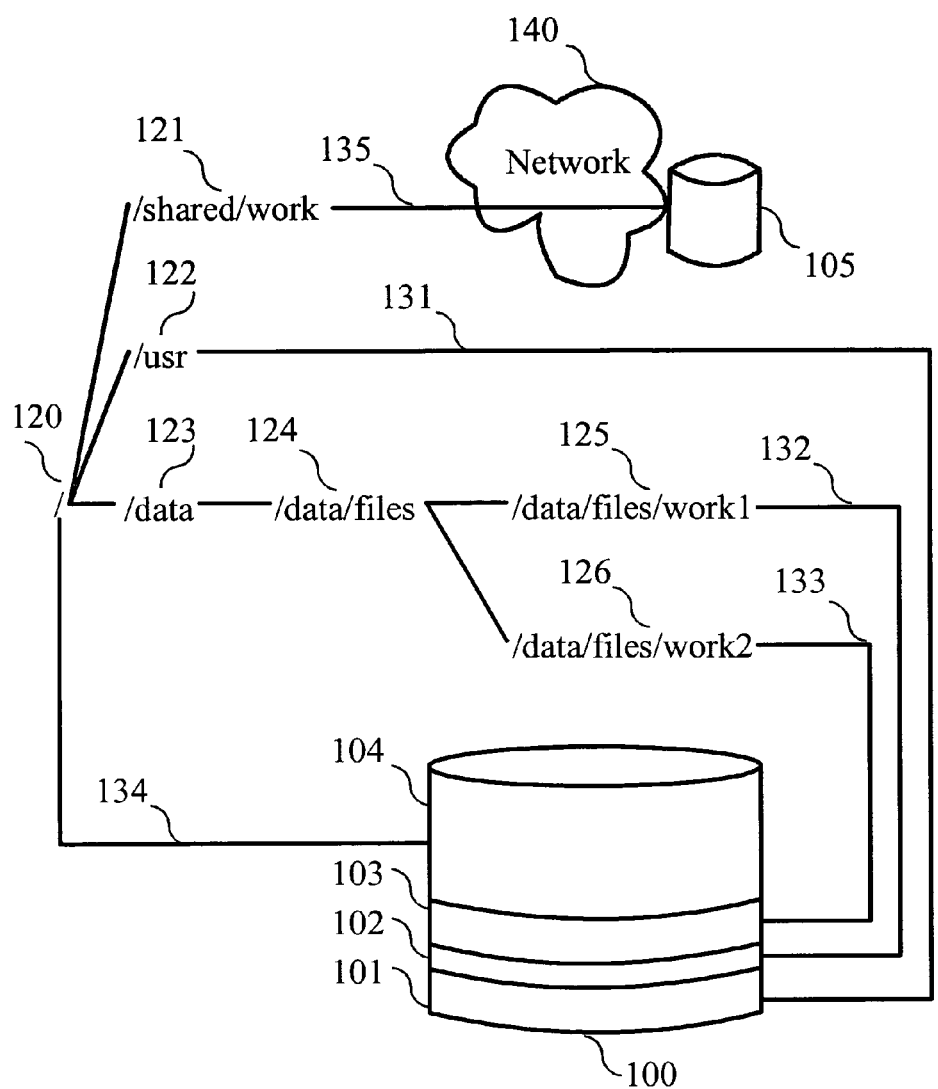
FIG. 1 is a block diagram illustrating an example of a directory tree in a LINUX™ computer in prior art.
Figure 2:
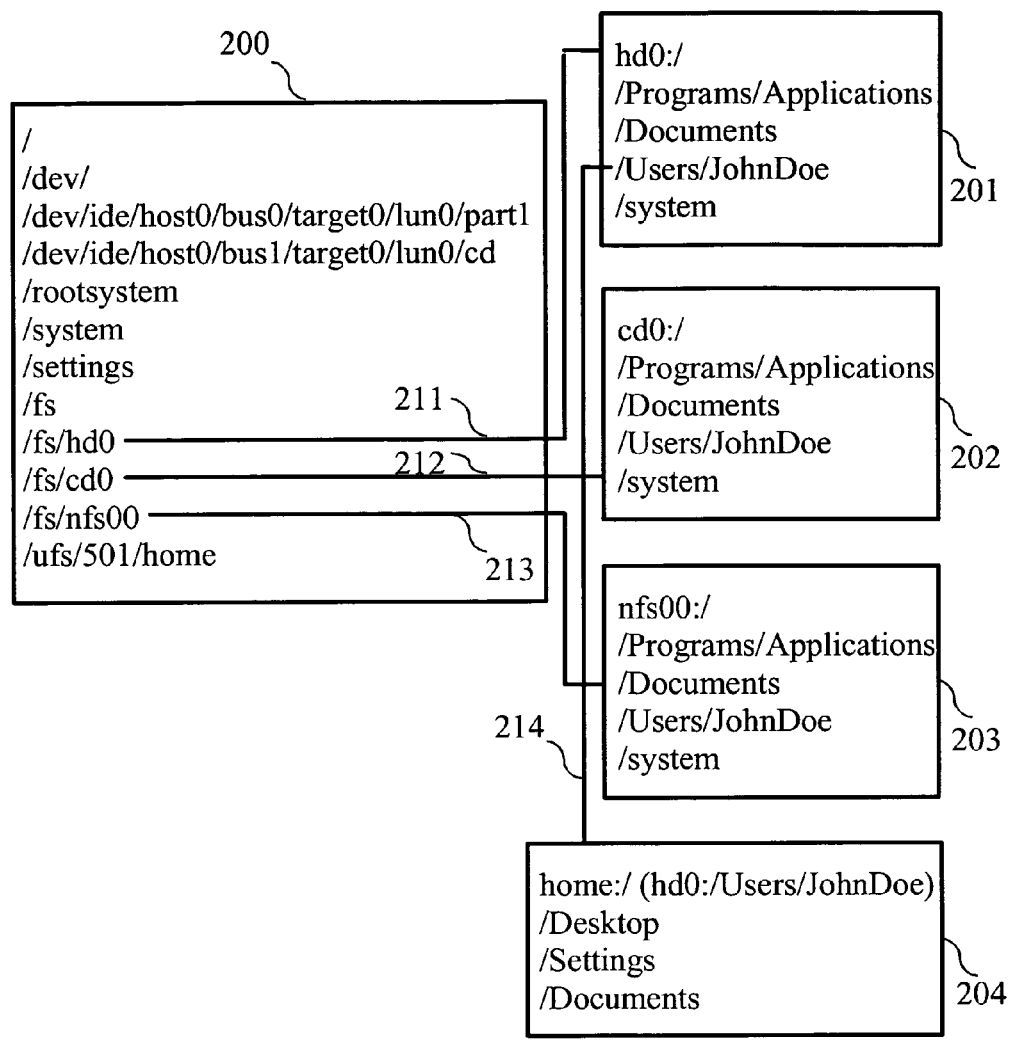
FIG. 2 is a block diagram illustrating a file system organization according to the invention.

FIG. 2 is a block diagram illustrating a file system organization according to the invention. In one embodiment of the invention, the file system is set-up and accessed using the method illustrated in FIG. 3. In FIG. 2 there is a Random Access Memory (RAM) disk 200, which stores a root file system. The root file system comprises a number of directories. A directory "/dev" is used to refer to secondary memory devices according to the invention. In directory "/dev" there are two logical files, namely files "/dev/ide/host0/bus0/target0/lun0/part1" and "/dev/ide/host0/bus1/target0/lun0/cd" which represent the primary partition of the local hard disk drive and the CD-ROM station, respectively. There are other similar logical files for the rest of the local secondary memory devices. On RAM disk 200 there is also a link named "/system", which refers to the actual directory containing the executable files of the operating system. The link enables executable files to be located on a file system in a removable secondary memory medium such as a CD-ROM or a USB disk. The operating system may be updated by replacing the secondary memory medium. On RAM disk 200 there is also a link named "/settings", which refers to the actual directory containing the operating system settings. By storing the operating system settings and the executable files of the operating system on separate file systems on separate physical disks it is possible to update the operating system and yet simultaneously to maintain the old familiar settings. On RAM disk 200 there is also a directory "/fs", which is used to store the mount points for a variety of secondary memories such as memory devices, memory device partitions and NFS directories. In directory "/fs" there is a mount point "/fs/hd0", which is used to mount the file system on the primary partition of the local hard disk, a mount point "/fs/cd0", which is used to mount the file system on the CD-ROM station, and "/fs/nfs00", which is used to mount a network file system. It should be noted that there might be any number of file systems, any number of local hard disks, any number of CD-ROM stations and any number of NFS directories that are mounted under the "/fs" directory.

In FIG. 2 there is a file system 201, which is referred to as "hd0:". File system 201 represents the file system on the primary partition on the local hard disk. There is also a file system 202, which is referred to as "cd0:". File system 202 represents the file system on the CD-ROM station. There is also a file system 203, which is referred to as "nfs00:". File system 203 represents a network file system. File systems 201, 202 and 203 have been mounted to mount points "/fs/hd0", "/fs/cd0" and "/fs/nfs00" as illustrated with lines 211, 212 and 213, respectively. In file system 201, there is also a directory named, for example, "/Users/JohnDoe", which is also referred to using a link named "home:". The directory is shown to the user also as a file system 204, which is similar in appearance to file systems 201, 202 and 203, even though the file system 204 is merely a subdirectory under file system 201 as illustrated with line 214. The directory "/Users/JohnDoe" acts as the home directory of a user whose name is John Doe. The files under the directory are stored in file system 201, but the user is provided with the link "home:" in order to conveniently refer to the files in that directory.

Figure 3:
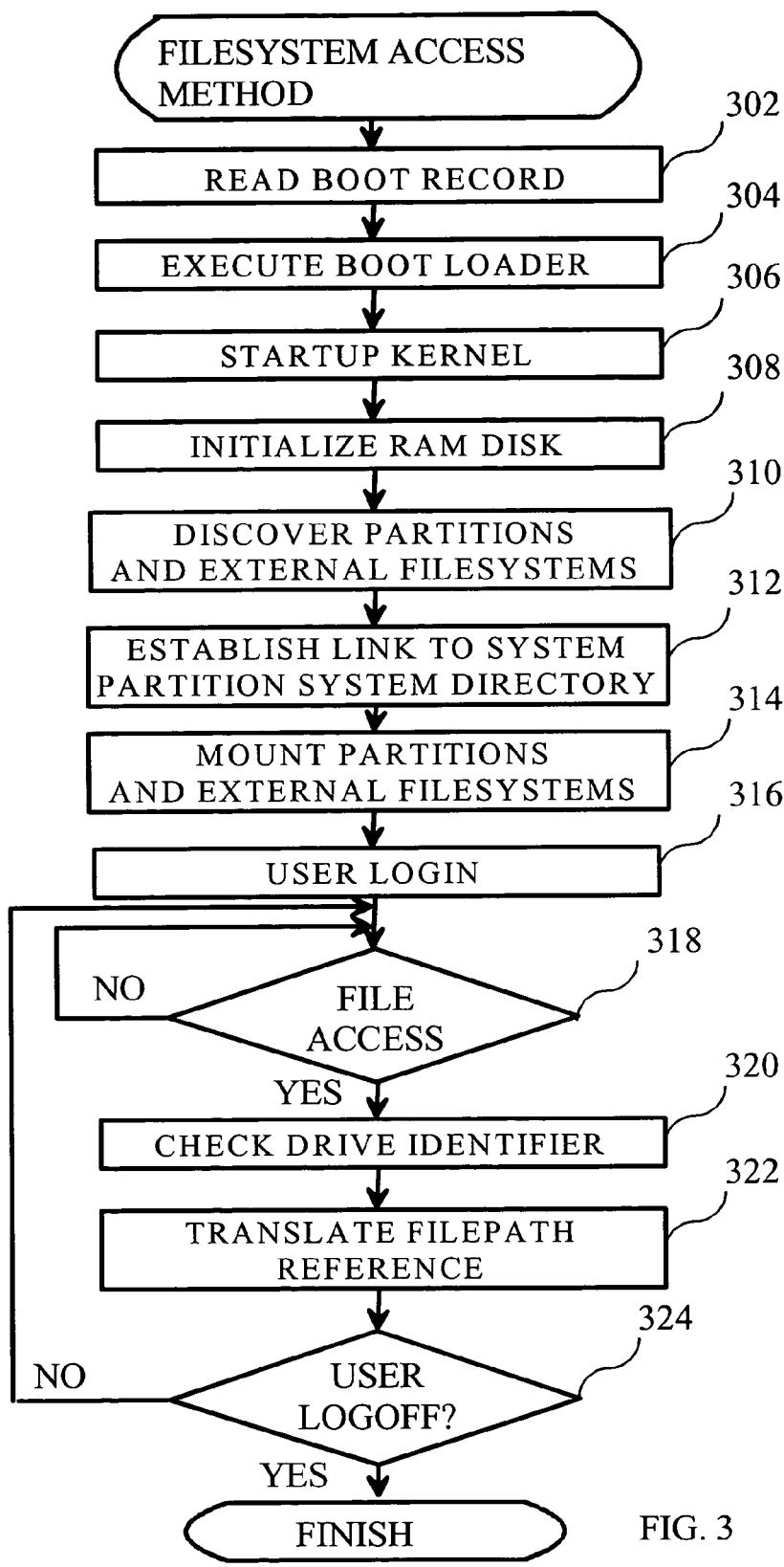
FIG. 3 is a flow chart depicting one embodiment of a file system access method according to the invention.

FIG. 3 is a flow chart depicting one embodiment of a file system access method according to the invention.

At step 302 an electronic device is powered on or reboots. The basic input/output system in the electronic device reads a Master Boot Record (MBR). The MBR stored at the sector at cylinder 0, head 0, sector 1 of the local hard disk. The MBR is first of what could be many partition sectors, each one containing a four-entry partition table. A small program in the MBR will attempt to locate an active bootable partition in its partition table. If such a partition is found, the boot sector of that partition is read into memory at location 0000:7C00 and the MBR program jumps to the memory location 0000:7C00. Each operating system may have its own boot sector format. The small program in the boot sector must locate the first part of the operating system's boot loader program or the kernel itself or a boot manager program and read that into the memory. At step 304 the boot loader program is executed.

At step 306 the boot loader loads and starts up the kernel program. The boot loader program loads the contents of a device file "/dev/initrd" on the file system in the boot partition.

At step 308 RAM disk 200 of FIG. 2 is initialized. On kernel startup, the kernel decompresses and copies the contents of device "/dev/initrd" onto device "/dev/ram0", which refers to RAM disk 200. The kernel then read-write mounts device "/dev/ram0" as the initial root file system. RAM disk 200 is maintained and the mounting is not released, that is, no umount operation is performed on it. RAM disk 200 remains as the device, which stores the file system root and mount points for the mounting of file systems on to be mounted for the user. The file systems to be mounted may be located, for example, on the partitions of the local hard disk drive, on a CD-ROM station and in NFS directories.

At step 310 a file system handler entity discovers the partitions and external file system that are to be mounted. The file system handler entity gets information on the partition, from which operating system files are to be found, from the boot loader. This partition is referred to as the system disk. All executable files of the operating system are kept in a single directory referred to as the system folder. All operating system settings are stored in a single folder, which is referred to as the settings folder. All data relating to system hardware is stored in a single folder, which is referred to as the configuration folder. The file system handler entity goes through directory "/dev" on RAM disk 200 and finds all hard disk partitions. The hard disk partitions may come from at least one local hard disk drive that is connected to the computer unit executing the current method either via an Integration Device Electronics (IDE) interface or a Small Computer System Interface (SCSI). In directory "/dev" hard disk partitions are named, for example, using the convention "/dev/[IDE|SCSI]/host[0-9]/bus[0-9]/target[0-9]/lun[0-9]/part[0-9]". The device type may be either Integration Device Electronics (IDE) or Small Computer System Interface (SCSI). The hosts may be numbered from 0 to 9, busses from 0 to 9, targets from 0 to 9, logical units from 0 to 9 and partitions from 0 to 9. For each partition found a mount point is created in directory "/fs" on RAM disk 200. The mount points are named as "/hd0", . . . , "/hdN", wherein N denotes the number of partitions to which a mount point is created. The resulting full file paths for the mount points are thus "/fs/hd#", wherein # denotes the number of the mount point. The information on each file system mounted is also added to a file "/rootsystem/etc/fstab". The file system handler entity mounts the partition, which acts as the system disk. The partition is recognized based on the information received from the boot loader.

At step 312 a link from a directory "/system" to a directory "/fs/hd#/system" is formed, wherein "/hd#" refers to the mount point for the partition that contains the system folder, which stores the executable files of the operating system.

At step 314 the partitions on local hard disk drives are mounted normally, for example, using the LINUX™ mount operation. Further, all CD-ROM stations, floppy disk drives and hard disk drives accessed via the Universal Serial Bus (USB) interface are mounted, for example, using a super-mount function familiar from the Mandrake LINUX™ distribution. Supermount is a kernel module that performs the mounting operation.

At step 316 the system is ready to allow users to log into the system. At this step a user logs into the system and is provided with the file access method according to the invention. The user may thus refer to files with file name paths in which at the start of the file name path there is a drive identifier. The drive identifier comprises at least one letter. In one embodiment of the invention, a drive identifier "hd#" refers to a partition on a local disk drive, wherein # is an integer that represents a logical number of the partition. For example, if there are two partitions, they may be numbered 0 and 1. In one embodiment of the invention, a drive identifier "cd#" refers to a local CD-ROM station, wherein # is an integer that represents a logical number of the station. In one embodiment of the invention, a drive identifier "nfs#" refers to an NFS directory, wherein # is an integer that represents a logical number of the directory. For example, the NFS directories mounted for the user may be numbered logically from 0 onwards, wherein "0" or "00" represents the first NFS directory mounted for the user.

At step 318 it is checked by the file system handler entity, whether the user issues a file access request. If no file access request is received, step 318 is repeated. If a file access request is received, the method continues at step 320. The file access request may originate from a command shell prompt directly or it may originate from a process invoked by the user from which a file access operation is called. The file system handler entity wraps the operating system file access methods. In other words, the file access methods are passed to the operating system via the file system handler entity. The file system handler entity may transform file name paths in file access requests from the form according to the invention to the normal form of the LINUX™ operating system.

At step 320 a file system access request from a user process is handled by the file system handler entity. The file name path is provided as a string. The file system handler entity parses the file name path and checks if a drive identifier is present. The file system handler entity extracts the drive identifier.

At step 322 the drive identifier is translated by the file system handler entity into a full file name path in accordance with the LINUX™ operating system. The translation is performed so that the mount point on RAM disk 200 corresponding to the drive identifier is obtained by the file system handler entity. The file system handler entity may also perform a sequence of file name path transformation operations in order to arrive at a full file name path. For example, drive identifier "home:" is translated to a file name path starting with "hd0:" and that file name path is further translated to the full file name path. Thereupon, the full file name path is provided to the operating system in a file access request issued from the file system handler entity.

At step 324 the system checks if the user logs off. If the user does not log off, the method continues at step 318.

In one embodiment of the invention, there is a program directory by means of which application program executable files may be found and a library directory by means of which library files associated with application programs may be found. The two specific directories are located in a subdirectory directly under a file system directory that is referred to using a drive identifier. The program directory does not actually contain the application program executable files themselves. The application program executable files may be located in any subdirectory within the file system directory referred to using the drive identifier. The program directory merely comprises links. In the program directory there is a link to each application program executable file that is stored somewhere within the file system directory referred to using the drive identifier. In other words, there is a link for each executable file within the logical drive. Similarly, the library directory does not actually contain the library files themselves. The library may be located in any subdirectory within the file system directory referred to using the drive identifier. The library directory merely comprises links. In the library directory there is a link to each library file that is stored somewhere within the file system directory referred to using the drive identifier. Typically, on the logical drive there are specific directories for each separate application and its libraries.

In one embodiment of the invention, the file system handler entity forms a database for at least one logical drive. The database comprises information for each application downloaded to the logical drive. As a new application is added to the database, links in the aforementioned program directory and the aforementioned library directory are formed for the executable files and the library files, respectively, associated with the application. In one embodiment of the invention there is no explicit database file with, for example, entries for each application, but the two aforementioned directories and the link information therein act as the database. As an application is removed, the database is utilized to remove the links from the two aforementioned directories. Similarly, the directories actually containing the application files themselves may be removed using information in the database. The program directory may be named "hd0:/Programs/commands" and the library directory may be named "hd0:/Programs/library". These two directories store executable file links and library links, respectively, for applications under logical drive "hd0:". When representing the same thing with an arbitrary drive identifier the directory names become "drive:/Programs/commands" and "drive:/Programs/library", wherein "drive" stands for an arbitrary drive identifier. A predetermined directory structure under a logical drive is referred to as an interface in this disclosure. The interface comprises at least the program and the library directories mentioned hereinbefore. The specific directories, which are always located on a specific fixed place within any logical drive and comprise always links that refer to files of a given type, are referred to as interface directories. For example, the directory "drive:/Programs/commands" is an example of an interface directory.

In one embodiment of the invention, the predetermined directory structure on any given logical drive is utilized while operating system environment variables are set. In a given operating system there are a number of environment variables that may specify arbitrary settings such as flags, file names and file search paths for a variety of applications. A file search path is essentially a list that comprises at least one directory name. For example, when the user logs on to the system, a path set-up entity is run.

The path set-up entity forms at least one file search path. There is an environment variable for each file search path. The path set-up entity checks what logical drives there are in the system. For each logical drive the path set-up entity checks the interface directories present on that logical drive and adds the interface directories to their corresponding environment variables. In the environment variables the interface directories are referred to using their abbreviated file name paths wherein the mount points are replaced with drive identifiers, that is, for example, "/fs/hd0/Programs/commands" is referred to with "hd0:/Programs/commands". As the path set-up entity is finished each environment variable processed by it has as its value a file search path comprising at least one directory name. It should be noted that the path set-up entity might also process any predefined directories to be added to file search paths from more than a single logical drive. The directories do not necessarily have to be interface directories.

Examples of environment variables set-up by the path set-up entity include "BIN_PATH" and "LIBRARY_PATH". The environment variable "BIN_PATH" comprises the program directories on each logical drive and the environment variable "LIBRARY_PATH" comprises the library directories on each logical drive.

In one embodiment of the invention, the path set-up entity also adds the interface directory names in their original LINUX™ format, in which they are specified with full file name path, to certain environment variables. The purpose of this solution is to support applications, which do not support a file name path translation in accordance with the invention. In one embodiment of the invention, at least one logical drive is skipped by the path set-up entity and the interface directories in it are not added to at least one file search path.

In one embodiment of the invention, there is formed a universal drive identifier, which acts as a common reference to at least two drive identifiers formed according to the invention. The logical drives, to which the common reference refers, may be called a logical drive cluster. From the user viewpoint, the directories on the logical drives in the logical drive cluster are considered merged. Firstly, is considered a directory present in more than one logical drive in the logical drive cluster. The user will see the files and subdirectories present in the instances of that directory as if they were stored in a single large directory. In this case there is no need for the user to memorize on which particular logical drive a given file was located before being able to access that file. Similarly, in directory listings the directories are presented to the user as if they were merged.

In one embodiment of the invention, as a universal drive is formed by the file system handler entity, it must resolve all file name conflicts resulting from two or more file with identical file names appearing in two or more logical drives in the drive cluster. Adding a drive identifier as a file name component for each identically named file achieves the resolving of file name conflicts.

In one embodiment of the invention, the universal drive identifiers are achieved so that there is a specific sequence of step for it in the file system handler entity. A file access request from a user process is handled by the file system handler entity. The file name path is provided as a string. The file system handler entity parses the file name path and checks if a universal drive identifier is present. The file system handler entity extracts the drive identifier. The file system handler entity maps the universal drive identifier to a list of logical drive identifiers. The file system handler entity checks one by one the logical drives in the list and checks if the file specified by the user was located there. As the file is found, the universal drive identifier is replaced with the logical drive from where the file was found. Thereupon, the file access request is directed to the second step of file name path translation where the file system handler entity translates the drive identifier part in a full file name path in accordance with the LINUX™ operating system. In the case of directory listing command processing, the file system handler entity will merge the file data from each logical drive belonging to the logical drive cluster.

In one embodiment of the invention, there is a specific directory for application programs directly in the file system directory referred to using a drive identifier. This directory is referred to as the programs directory. The actual name of the directory may be, for example, "/programs" and it may be located, for example, on the logical drives corresponding to identifiers "hd0:", "nfs00:" and "home:". This embodiment enables that the user is presented with a user interface menu in which the programs from the program directories from a given set of drive identifiers are presented as a single list. In other words, the program directories appear to the user as merged. The single list may appear in the user interface, for example, as a single folder. The same treatment may be applied also for any given category of files such as documents, pictures and video clips, provided that for this category there is a specific directory directly under the directories pointed to using the drive identifiers. In one embodiment of the invention, a file of given type is used to indicate that the directory, in which it is placed, must not be presented in the user interface menu. In one embodiment of the invention, two separate user interface menus are formed, one for the drive identifiers corresponding to removable mass memories such as CD-ROMs or USB hard disk drives and the other for fixed mass memories such as local IDE or SCSI hard disk drives and NFS directories.

Figure 4:
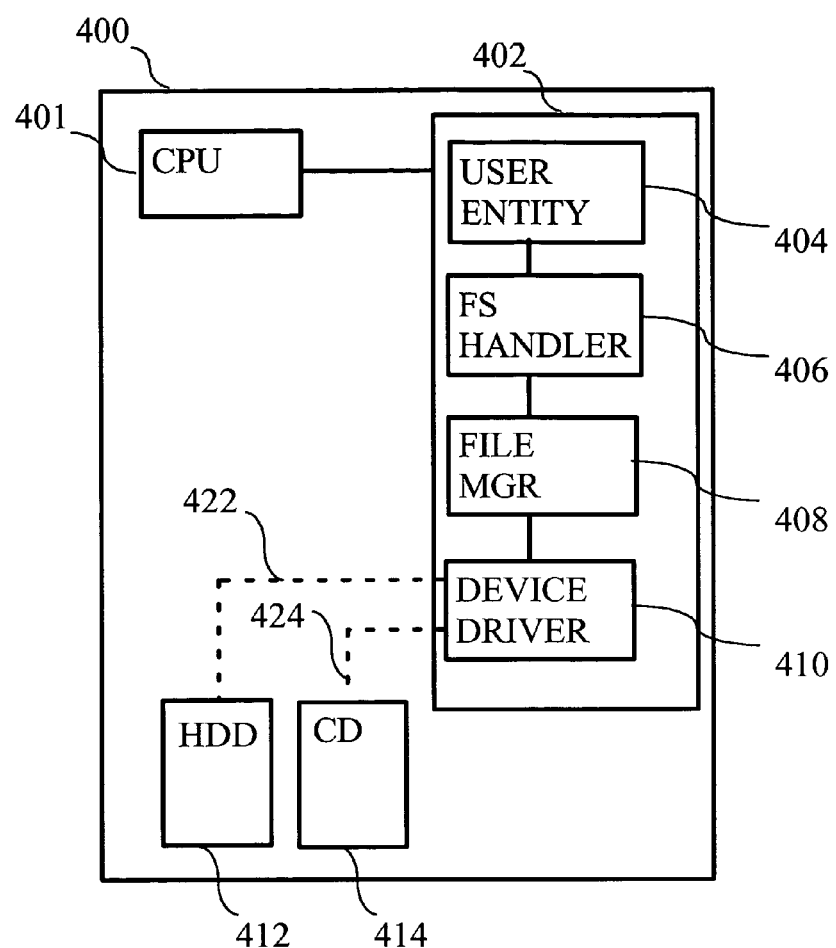
FIG. 4 is a block diagram illustrating an electronic device according to the invention.

FIG. 4 is a block diagram illustrating an electronic device 400 in one embodiment of the invention. Electronic device 400 comprises a CPU 401 and a primary memory 402, which are connected. Electronic device 400 has also two secondary memories, namely local hard disk drive 412 and a CD-ROM station 414. In memory 402 there are software entities 404-410. There is a user entity 404, which is, for example, a command shell or a user process executed by CPU 401. User file access request comprising file name paths are passed by user entity 404 to a file manager entity 408 via file system handler entity 406, which performs file name path translation and file system set-up as illustrated in association with FIG. 3. The file manager entity is associated with the operating system in electronic device 400. File manager entity may be part of operating system kernel or a separate process or module. File manager entity 408 translates logical file requests into physical data block requests sent to a device driver 410 as will be appreciated by an expert in the field. Device driver 410 controls the secondary memories in a device type and vendor specific way. The control of the devices 412 and 414 is illustrated with dashed lines 422 and 424.

It will be evident to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for accessing files in an electronic device, the method comprising:
setting up a Random Access Memory (RAM) disk, said Random Access Memory (RAM) disk comprising a file system root of said electronic device;
discovering at least one file system to be mounted in said electronic device;
establishing mount points on said Random Access Memory (RAM) disk for each said file system;
assigning drive identifiers for each said file system;
detecting a file access request for a specified file comprising a first file name path and a drive identifier;
parsing the first file name path and determining whether the drive identifier is present;
extracting the drive identifier;
mapping said drive identifier to a mount point and to a list of logical drive identifiers;
identifying each of the logical drive identifiers in the list to determine whether any of said logical drive identifiers provide a location of the specified file;
forming a second file name path based on said mount point and said first file name path;
accessing the specified file using said second file name path in said electronic device;
determining the specified file is stored in one of the logical drive identifiers;
replacing the drive identifier with the logical drive identifier that stored the specified file responsive to the specified file being identified in one of the logical drive identifiers;
checking at least one logical drive for presence of at least a first predefined directory;
forming at least one file search path comprising an entry for each logical drive on which said first predefined directory was present; and
storing said at least one file search path to at least one environment variable comprising at least one of program directories on each logical drive and library directories on each logical drive.

2. The method according to claim 1, wherein said operating system comprises the LINUX™ operating system.

3. The method according to claim 1, the method further comprising:
forming a first partition comprising a first file system comprising operating system executable files;
forming a second partition comprising a second file system comprising at least one operating system configuration file;
a boot loader providing information on said first partition; and
establishing on said Random Access Memory (RAM) disk a first link to said first file system and a second link to said second file system.

4. The method according to claim 1, the method further comprising:
detecting a request for a file a name of which comprises a third file name path comprising a universal drive identifier;
mapping said universal drive identifier to at least two drive identifiers;
checking the logical drives identified using said at least two drive identifiers for presence of said file; and forming said first file name path comprising a drive identifier for the logical drive on which said file is present.

5. The method according to claim 3, wherein said second partition is accessed by said electronic device from a remote node.

6. The method according to claim 3, wherein said second partition is accessed by said electronic device from a removable memory medium.

7. An electronic device comprising a processor and a Random Access Memory (RAM), the electronic device further comprising:
the processor being configured to control an operating system to set up a Random Access Memory (RAM) disk, said Random Access Memory (RAM) disk configured to store a file system root of said electronic device, and to access a specified file using a second file name path in said electronic device; and
a file system handler entity configured to
discover at least one file system to be mounted in said electronic device,
establish mount points on said Random Access Memory (RAM) disk for each said file system,
assign drive identifiers for each said file system,
detect a file access request for the specified file comprising a first file name path and a drive identifier
parse the first file name path and determine whether the drive identifier is present,
extract the drive identifier,
map said drive identifier to a mount point and to a list of logical drive identifiers,
identify each of the logical drive identifiers in the list to determine whether any of said logical drive identifiers provide a location of the specified file,
form a second file name path based on said mount point and said first file name path,
determine the specified file is stored in one of the logical drive identifiers,
replace the drive identifier with the logical drive identifier that stored the specified file responsive to the specified file being identified in one of the logical drive identifiers
check at least one logical drive for presence of at least a first predefined directory;
form at least one file search path comprising an entry for each logical drive on which said first predefined directory was present, and
store said at least one file search path to at least one environment variable comprising at least one of program directories on each logical drive and library directories on each logical drive.

8. The electronic device according to claim 7, wherein said operating system comprises an open source operating system.

9. The electronic device according to claim 7, the electronic device further comprising:
said file system handler entity configured to form a first partition comprising a first file system comprising operating system executable files, to form a second partition comprising a second file system comprising at least one operating system configuration file, and to establish on said Random Access Memory (RAM) disk a first link to said first file system and a second link to said second file system; and
a boot loader entity configured to provide information on said first partition to said file system handler entity.

10. The electronic device according to claim 7, the electronic device further comprising:
said file system handler entity configured to detect a request for a file the name of which comprises a third file name path comprising a universal drive identifier, to map said universal drive identifier to at least two drive identifiers, to check the logical drives identified using said at least two drive identifiers for presence of said file, and to form said first file name path comprising a drive identifier for the logical drive on which said file is present.

11. The electronic device according to claim 9, wherein said second partition is accessed by said electronic device from a remote node.

12. The electronic device according to claim 9, wherein said second partition is accessed by said electronic device from a removable memory medium.

13. A non-transitory computer readable storage medium configured to store a computer program comprising code adapted to perform the following operations when executed by a processor:
setting up a Random Access Memory (RAM) disk, said Random Access Memory (RAM) disk comprising the file system root of an electronic device;
discovering at least one file system to be mounted in said electronic device;
establishing mount points on said Random Access Memory (RAM) disk for each said file system;
assigning drive identifiers for each said file system;
detecting a file access request for a specified file comprising a first file name path and a drive identifier;
parsing the first file name path and determining whether the drive identifier is present;
extracting the drive identifier;
mapping said drive identifier to a mount point and to a list of logical drive identifiers;
identifying each of the logical drive identifiers in the list to determine whether any of said logical drive identifiers provide a location of the specified file;
forming a second file name path based on said mount point and said first file name path
accessing the specified file using said second file name path in said electronic device;
determining the specified file is stored in one of the logical drive identifiers;
replacing the drive identifier with the logical drive identifier that stored the specified file responsive to the specified file being identified in one of the logical drive identifiers;
checking at least one logical drive for presence of at least a first predefined directory;
forming at least one file search path comprising an entry for each logical drive on which said first predefined directory was present, and
storing said at least one file search path to at least one environment variable comprising at least one of program directories on each logical drive and library directories on each logical drive.

14. The non-transitory computer readable storage medium according to claim 13, wherein said computer program is stored on the RAM.

15. The non-transitory computer readable storage medium according to claim 14, wherein said computer readable storage medium is a removable memory card.

16. The non-transitory computer readable storage medium according to claim 14, wherein said computer readable storage medium is a magnetic or an optical disk.

* * * * *